(12) United States Patent
Malkamaki (10) Patent No.: US 7,310,336 B2
(45) Date of Patent: Dec. 18, 2007

(54) HYBRID AUTOMATIC REPEAT REQUEST (HARQ) SCHEME WITH IN-SEQUENCE DELIVERY OF PACKETS

(76) Inventor: Esa Malkamaki, Riippakoivuntie 17B, 02130 Espoo (FI)

( * ) Notice: Subject to any disclaimer, the term of this patent is extended or adjusted under 35 U.S.C. 154(b) by 883 days.

(21) Appl. No.: 10/102,528

(22) Filed: Mar. 19, 2002

(65) Prior Publication Data

US 2002/0172208 A1    Nov. 21, 2002

Related U.S. Application Data (60) Provisional application No. 60/292,023, filed on May 18, 2001.

(51) Int. Cl.
*H04L 12/28* (2006.01)
(52) U.S. Cl. .................. 370/392; 370/349; 714/349
(58) Field of Classification Search ............... None
See application file for complete search history.

(56) References Cited

U.S. PATENT DOCUMENTS

| | | | |
|---|---|---|---|
| 6,301,249 B1 | 10/2001 | Mansfield et al. | 370/394 |
| 6,317,430 B1 | 11/2001 | Knisely et al. | 370/394 |
| 6,611,515 B1 * | 8/2003 | Balachandran et al. | 370/349 |
| 6,665,313 B1 * | 12/2003 | Chang et al. | 370/469 |
| 6,704,898 B1 * | 3/2004 | Furuskar et al. | 714/751 |
| 6,731,623 B2 * | 5/2004 | Lee et al. | 370/349 |
| 6,788,652 B1 * | 9/2004 | Hwang | 370/282 |
| 6,804,202 B1 * | 10/2004 | Hwang | 370/282 |
| 6,850,508 B1 * | 2/2005 | Chang et al. | 370/335 |
| 6,931,569 B2 * | 8/2005 | Fong et al. | 714/18 |
| 2001/0052072 A1 * | 12/2001 | Jung | 713/160 |

(Continued)

FOREIGN PATENT DOCUMENTS

JP    129413/1974    1/1974

(Continued)

OTHER PUBLICATIONS

AJIB W. et al., "Acknowledgement operations in the RLC layer of GPRS", Mobile Multimedia Communications, 1999. (MOMUC '99). 1999 IEEE International Workshop on San Diego, CA, USA Nov. 15-17, 1999, Piscataway, NJ, USA, IEEE, US Nov. 15, 1999, pp. 311-317, XP010370732 ISBN: 0-7803-5904-6.

(Continued)

*Primary Examiner*—Bob A. Phunkulh
(74) *Attorney, Agent, or Firm*—Ware, Fressola, Van Der Sluys & Adolphson LLP (57) ABSTRACT

A method, along with corresponding devices (11 12) and a system (11 12), by which in-sequence delivery of data blocks, sent wirelessly by a sending terminal (11), is provided to a radio link control layer (12a) of a receiving terminal (12) by a media access control layer service (12b) of the receiving terminal (12), where the data blocks are communicated according to a protocol, such as WCDMA, in which a media access control layer (11b) of the sending terminal (11) includes as a service the transmission of the data blocks and possible retransmission of the same data blocks in response to ACK/NAK signaling by a corresponding service included in a media access control layer of the receiving terminal. No data block sequence number is used in the ACK/NAK signaling.

24 Claims, 4 Drawing Sheets

U.S. PATENT DOCUMENTS

| | | | |
|---|---|---|---|
| 2002/0001296 A1* | 1/2002 | Lee et al. | 370/338 |
| 2002/0009999 A1* | 1/2002 | Lee et al. | 455/454 |
| 2002/0015416 A1* | 2/2002 | Lee et al. | 370/466 |
| 2002/0021698 A1* | 2/2002 | Lee et al. | 370/394 |

FOREIGN PATENT DOCUMENTS

| | | |
|---|---|---|
| JP | 218248/1983 | 12/1983 |
| JP | 194525/1989 | 8/1989 |
| JP | 205045/1994 | 7/1994 |
| JP | 8223214 | 8/1996 |
| JP | 032088/2000 | 1/2000 |
| JP | 007788/2001 | 1/2001 |
| WO | WO 00/08796 | 2/2000 |
| WO | WO 00/49761 | 8/2000 |
| WO | WO 00/54451 | 9/2000 |
| WO | WO 01/28180 | 4/2001 |
| WO | WO 02/096006 | 11/2002 |

OTHER PUBLICATIONS

Joe I: "A novel adaptive hybrid ARQ scheme for wireless ATM networks" Wireless Networks, ACM, New York, NY, US, vol. 6, No. 3, Jul. 2000, pp. 211-219, XP000965878, ISSN: 1022-0038, p. 214, left-hand column, line 23-right-hand column, line 27; p. 216, left-hand column, line 39—p. 217, left-hand column, line 28; figure 5.

TSG-RAN WG2 #21 Meeting, Busan, Korea, May 21-25, 2001; Title: Some HARQ issues; Tdoc R2-011179.

*Third Generation Mobile Communications Systems*, R. Prasad, W. Mohr, W. Konhäuser, Artech House, Boston/London, p. 153-159, 2000.

3rd Generation Partnership Project; Technical Specification Group Radio Access Network; Physical Layer Aspects of UTRA High Speed Downlink Packet Access (Release 4); 3 G TR25.848 V4.0.0 (Mar. 2001).

Panasonic (2001); Enhanced HARQ Method with Signal Constellation Rearrangement, TSG-RAN WG1 #19, Feb. 27-Mar. 2, 2001, Las Vegas, USA.

3rd Generation Partnership Project; Technical Specification Group Radio Access Network; Services provided by the physical layer (Release 4), 3GPP TS 25, 302 V4.2.0, Sep. 2001: Valbonne, France.

3rd Generation Partnership Project; Technical Specification Group Radio Access Network; High Speed Downlink Packet Access: Overall UTRAN Description (Release 5), 3GPP TR 25.855 V0.O.8, Jun. 2001; Valbonne, France.

Adaptive Modulation and Scheduling of IP Traffic over Fading Channels, Nilo Casimiro Ericsson, IEEE Vehicular Technology Conference—VTC'99-Fall, Amsterdam, The Netherlands, Sep. 19-22, 1999.

* cited by examiner

HYBRID AUTOMATIC REPEAT REQUEST (HARQ) SCHEME WITH IN-SEQUENCE DELIVERY OF PACKETS

CROSS REFERENCE TO RELATED APPLICATION

Reference is made to and priority claimed from U.S. provisional application Ser. No. 60/292,023, filed May 18, 2001, entitled HARQ SCHEME WITH IN-SEQUENCE DELIVERY OF PACKETS.

FIELD OF THE INVENTION

The present invention relates to wireless communication, such as provided by systems as specified in 3GPP (Third Generation Partnership Project) Wideband Code Division Multiple Access (WCDMA) release 5, High Speed Downlink Packet Access (HSDPA), but also as provided by other kinds of wireless communication systems. More particularly, the present invention relates to a modification of the so-called hybrid automatic repeat request (HARQ) used in HSDPA, a modification that allows in-sequence delivery of protocol data units (PDUs) to the radio link control layer (RLC) of the receiving wireless terminal.

BACKGROUND OF THE INVENTION

In Wideband Code Division Multiple Access (WCDMA) based systems, high speed data transmission may be enabled by means of the so-called high speed downlink packet access (HSDPA) transmission, which may provide functions such as fast hybrid automatic repeat request (HARQ), adaptive coding and modulation (AMC), and fast cell selection (FCS). A detailed description of these and other function of HSPDA can be found in the third generation partnership project technical report No. 3G TR25.848 release 2000, entitled PHYSICAL LAYER ASPECTS OF UTRA HIGH SPEED DOWNLINK PACKET ACCESS.

At the present it is assumed that with HSDPA, each user equipment receiving data on a high-speed downlink shared channel (HS-DSCH), which is a transport channel, i.e. a channel between the media access control (MAC) layer and the physical (PHY) layer, also allocates and uses an associated dedicated channel (DCH). The dedicated channel may be mapped to a dedicated physical channel (DPCH) in the physical layer. The DPCH is typically divided into a dedicated physical data channel (DPDCH) and a dedicated physical control channel (DPCCH), both in the uplink and in the downlink. Data such as power control commands, transport format information, and dedicated pilot symbols are transmitted on the DPCCH. Information such as diversity feedback information may also be transmitted on DPCCH in the uplink. The HS-DSCH may be mapped to one or several high speed physical downlink shared channels (HS-PDSCH) in the PHY layer.

The associated dedicated channel DCH is usually allocated for both the downlink and the uplink, and is usually used to carry HSDPA-related information and signaling as well as other dedicated data, such as speech and control data. A user terminal may communicate with several base stations (the term base station being used here in some places to indicate what is called a node B in UTRAN (Universal Mobile Telephone System (UMTS) Terrestrial Radio Access Network) specifications) at the same time during what is called soft handover, and in such situations the associated dedicated channel is said to be in soft handover.

In addition to there being a dedicated channel (DCH) associated with an HS-DSCH, there may also be a shared control channel (SCCH) associated with the HS-DSCH. A SCCH can be used to carry HS-DSCH specific information and signaling to users receiving data on the HS-DSCH.

According to current proposals, the dedicated channel (DCH) would be used to inform the user equipment that it has data to be read on the HS-DSCH and SCCH; in such an arrangement, a user would receive an indication on the dedicated channel of data to be read only when there is data for the user. With such use, the dedicated channel would serve as a pointer channel, since it would point the user to the shared channels.

The dedicated channel (DCH) would also convey information about modulation and coding schemes, power levels and similar parameters used for the shared channels. This information could also be sent on the shared channel. If the shared control channel is used carry this information, then it must be transmitted earlier than the corresponding shared is data channel (HS-DSCH). The shared control channel, on the other hand, would be used to carry information that is specific to the data transmitted on the shared data channel, information such as packet numbers for the HARQ process as well as other information. The shared control channel could be sent as a separate code channel (i.e. it could be code multiplexed) or could be sent using the same code channels as the HS-PDSCH (i.e. it could be time multiplexed with the HS-PDSCH).

Unlike the dedicated channel, according to existing proposals, the HS-DSCH is assumed not to be in soft handover; each base station is assumed to have its own shared channel and a user terminal is assumed to receive data on a HS-DSCH from only one base station at a time. The so-called fast cell selection (FCS) technique would be used to switch from one base station to another for receiving data on HS-DSCH. However, the shared channels would not use power control. Instead, the shared channels are proposed to be transmitted either with power that is fixed or with power that is semi-fixed (meaning that the power is not changed too often). The power could, for instance, be a cell-specific parameter.

In the current proposals, the high speed downlink shared channel (HS-DSCH) is planned to be associated with a dedicated channel that would carry in the downlink at least information regarding the timing when the receiving station is to receive on a shared channel. In the uplink, the associated dedicated channel would carry, among other information, required acknowledgements (ACK) used in a so-called fast HARQ, i.e. the HARQ process used by the MAC-high-speed (MAC-hs) layer/entity/service, as explained for explained in 3GPP TR 25.950 v4.0.0 (2001-03) UTRA High Speed Downlink Packet Access.

By way of an explanation of the phraseology used here: a HARQ process is used to indicate what is sometimes called a HARQ 'channel'; a data block is used here to indicate a HARQ data block and is a block of data transmitted (and retransmitted) by a HARQ entity in MAC-hs. A packet is a general term, and is sometimes used to mean a data block and sometimes a RLC PDU.

Release '99 RLC assumes that packets (RLC-PDUs) are received in order. For unacknowledged mode (UM) service, if an RLC-PDU is missing, the complete RLC service data unit (RLC-SDU) is discarded. For acknowledged mode (AM) service, a missing RLC-PDU causes a retransmission request. If the RLC-PDUs of a message are not received in sequence, some RLC-SDUs may be discarded unnecessarily for UM and some unnecessary RLC-PDU retransmissions may be generated for AM. Therefore, it is advantageous for either MAC-hs to provide in-sequence delivery of the RLC-PDUs of a message or for the RLC layer to be modified to support out of sequence delivery of RLC-PDUs. In addition to data PDUs, there are also RLC-control PDUs, which are not numbered, and so, if received out of sequence, cannot be reordered based on RLC PDU sequence numbers.

If re-sequencing is implemented at the MAC layer using the MAC-hs, HARQ data block numbering by MAC-hs is required. (RLC-PDU numbering is usually not known at the MAC layer.) This data block numbering should be across the HARQ processes (or the N HARQ 'channels' as they are called in TR 25.950) to recover from lost TTIs (transmission time intervals), i.e. TTIs for which the user terminal identifier cannot be read. A TTI is the time between consecutive deliveries of data between the medium access control (MAC) layer and the L1 transport layer, and so defines the periodicity at which Transport Block Sets are transferred to the physical layer on the radio interface. HARQ processes are the same as HARQ channels as described in TR 25.950. There are N HARQ processes, each operating with stop-and-wait (SAW) protocol. The incoming data blocks are distributed to different HARQ processes. The receiver has to know which HARQ process is being received at each moment. Therefore, the HARQ process number has to be sent on the shared control channel.

If longer HARQ data block numbers across the HARQ processes are used, HARQ process numbers are not needed since the soft combining of first transmissions and retransmissions of the same block can be based on the HARQ data block number. Using HARQ data block numbers makes the HARQ scheme similar to a selective repeat (SR) scheme. (In order to control the re-sequencing buffer sizes, some transmit and receive windows should be specified.)

Asynchronous HARQ requires that the HARQ process number be signaled in the downlink. If there are N=6 subchannels (i.e. 6 HARQ processes), 3 bits are needed to signal the HARQ process number. In addition, at least one bit sequence number is needed per HARQ process (channel) to recover from errors in ACK/NACK. This implies that at least four-bit 'sequence numbers' are needed with asynchronous N-channel HARQ. Four-bit sequence numbers would not, however, guarantee in-sequence delivery of the packets (RLC-PDUs). The SAW protocol guarantees that within each HARQ process the data blocks are delivered in order. However, it is possible that a data block in one HARQ process goes through faster (with less retransmissions) than another (earlier) data block in another HARQ process. Furthermore, if a data block is totally missed in between (i.e. the UE does not know whether the lost block was intended for it or for some other UE), then the UE can not continue to keep track of the correct order of the data blocks.

What is needed is an asynchronous N-channel HARQ scheme (i.e. an N-process HARQ scheme) with sequence numbers across the N channels (processes) where the sequence numbers are long enough to guarantee in-sequence delivery of packets (RLC-PDUs) to the RLC layer by the MAC-hs layer, but short enough so as not to significantly increase the signaling load.

SUMMARY OF THE INVENTION

Accordingly, in a first aspect of the invention, a method is provided for use in a wireless communication system using a layered protocol, a method in which a first protocol layer of a sending terminal sends packets as a sequence of data blocks to a peer first protocol layer of a receiving terminal, which delivers the packets to a higher protocol layer, the method including: the sending terminal, in response to a sequence of data blocks for transmission to the receiving terminal, assigning a respective data block sequence number to each data block in the sequence of data blocks; and the receiving terminal, in response to the sequence of data blocks and to the respective data block sequence numbers, delivering in order at least some of the data blocks in the sequence of data blocks to the higher protocol layer of the receiving terminal; the method characterized by the receiving terminal acknowledging receipt of the data blocks without providing information indicating the respective data block sequence numbers.

In accord with the first aspect of the invention, the sequence numbers may be communicated in-band with the data blocks or out-band, and if delivered out-band, the sequence numbers may be used in HARQ combining. Also in accord with the first aspect of the invention, each data block may be acknowledged separately, and the acknowledgement may be sent after a predefined delay.

Still also in accord with the first aspect of the invention, the layered protocol may include a MAC layer having a MAC-hs entity and also including an RLC layer, and the first layer may be the MAC layer, and the higher layer may be the RLC layer, and the MAC-hs entity of the receiving terminal may provide the signaling acknowledging receipt of the data blocks without use of sequence numbers and may deliver the data blocks in order to the RLC layer of the receiving entity.

In a second aspect of the invention, a wireless terminal is provided, for use in wireless communication via a wireless communication system with other communication devices including other wireless terminals, characterized in that it is operative as either a sending terminal or as a receiving terminal according to the respective steps of the first aspect of the invention.

In a third aspect of the invention, a base station is provided, for use as an element of a wireless communication system providing at least parts of connections between wireless terminals and other communication devices including other wireless terminals via wireless communication, characterized in that it is operative as either a sending terminal or as a receiving terminal according to the respective steps of the first aspect of the invention.

In a fourth aspect of the invention, a wireless communication system is provided for use in providing at least parts of connections between wireless terminals and other communication devices including other wireless terminals via wireless communication, the wireless communication system having terminals at least two of which are able to function as a sending terminal and as a receiving terminal, characterized in that the at least two terminals are both operative as both a sending terminal and a receiving terminal according to the respective steps of the first aspect of the invention.

Besides providing for in-sequence delivery (to the RLC layer of a receiving terminal or to some other higher layer protocol of a receiving terminal) of user (data) PDUS, the invention can also be used to provide for in-sequence delivery of control PDUs.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

For wireless transmission of packets (RLC-PDUs), encapsulated in (MAC) data blocks, between the RLC layers of two terminals using the MAC layer service MAC-hs, the invention provides an asynchronous N-channel HARQ scheme in which HARQ sequence numbers of at least five bits are used across the N channels (i.e. across the HARQ process), i.e. for each MAC-hs data block. Using such sequence numbers can guarantee in-sequence delivery of RLC-PDUs (packets), after being transmitted encapsulated in (MAC) data blocks, by the MAC-hs service of the receiving terminal. The (MAC) data blocks are provided to the PHY layer via transport channels during TTIs.

According to the invention, the MAC-hs data blocks are numbered before transmission, then the data blocks are distributed to different HARQ processes for transmission. If the MAC-hs data block number is sent out-band on the shared control channel (SCCH), then it can also be used for soft combining of the data blocks in the physical layer, meaning combining of the retransmitted versions of the same data block in the physical layer using the soft decisions before the channel decoding of the block. When the physical layer receives a data block, it has to know whether this block is new or a retransmission. If it is a retransmission then the physical layer needs to know with which earlier received block this block should be combined. In N-channel HARQ, the retransmission is always sent using the same HARQ process. Therefore, the physical layer knows which blocks to combine based on the HARQ process number. However, if the MAC-hs data block number is sent out-band on the SCCH, then the MAC-hs data block number (instead of the HARQ process number) can be used to indicate which blocks to combine. The MAC-hs layer would then use these MAC-hs data block numbers to resequence the data blocks received over the N channels, i.e. MAC-hs holds the data blocks (which contain the RLC PDUs) in a resequencing buffer until all are received correctly and ordering the correctly received data blocks before delivery to the RLC. Further, as in N-channel HARQ, the acknowledgement is synchronous (or in other words, it is carried out according to a synchronous communication protocol), i.e. each TTI is acknowledged separately after a fixed (or semi-static) delay, and so sequence numbers are not needed in the acknowledgement of a data block.

The invention is described below in the context of WCDMA HSDPA, and in particular in case of a downlink data transmission and uplink ACK/NAK signaling. It should be understood, however, that the invention is of use in other contexts, including downlink ACK/NAK signaling, and in case of communication using other than WCDMA HSDPA.

Figure 1:
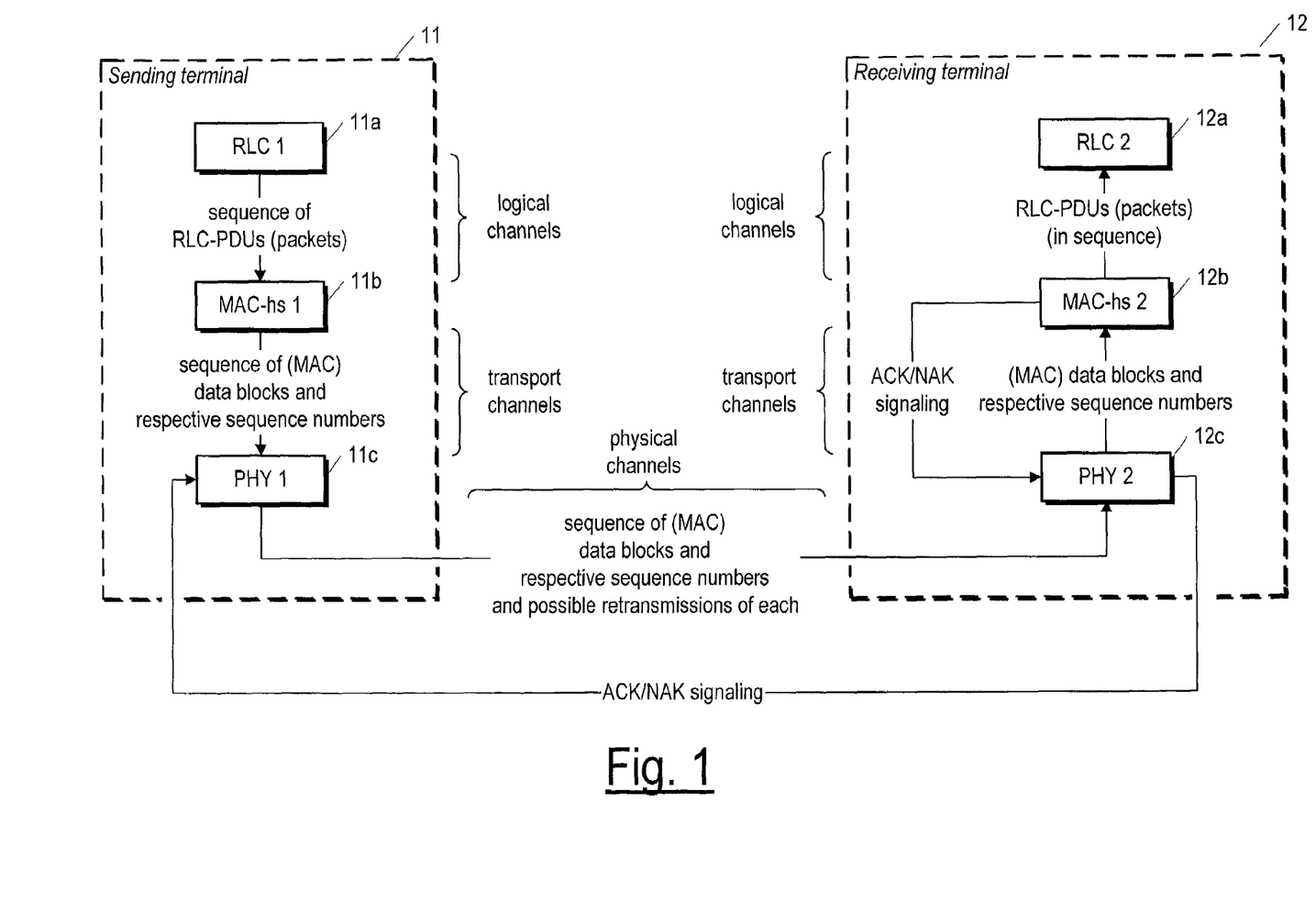
FIG. 1 is a data block diagram/flow diagram of a system including a sending terminal (a base station or a wireless terminal such as a mobile phone) and a receiving terminal (a base station or a wireless terminal), where the sending terminal is sending a sequence of data blocks to the receiving terminal according to the invention.

Referring now to FIG. 1, a sending terminal 11 and a receiving terminal 12 are each shown as including modules 11a 11b 11c 12a 12b 12c for operating according to a WCDMA protocol. More specifically, in the sending terminal 11, an RLC module 11a is a source of a sequence of packets (RLC-PDUs) intended for a peer RLC module 12a of the receiving terminal 12. The RLC module 11a of the sending terminal provides the sequence of packets to a MAC-hs module 11b of the sending terminal, which, according to the invention, after encapsulating the packets in MAC data blocks, assigns a respective sequence number to the data blocks. The MAC-hs module 11b of the sending terminal then provides the sequence numbers and the data blocks to a PHY module 11b of the sending terminal over one or another transport channel, and the PHY module 11c then transmits the data blocks and their respective sequence numbers to the receiving terminal 12 over usually various physical channels (explained in more detail below, especially in connection with FIG. 2).

It should be noted that FIG. 1 is a simplified view of the operation of a receiving terminal. Some protocol layers/entities are omitted for clarity, such as the MAC-d entity and the MAC-c/sh entity between the RLC and the MAC-hs entity.

Still referring to FIG. 1, at the receiving terminal 12, a PHY module 12c receives the various physical channels used to convey the data blocks and their respective sequence numbers and provides them to a MAC-hs module 12b (over various transport channels). Then, using ACK/NAK signaling to prompt the sending terminal to resend the data blocks that are not successfully received, the MAC-hs data block 12b extracts from each (MAC-hs) data block whatever packets are encapsulated in the data block and, based on the respective sequence numbers of the data blocks (and assuming that the packets are encapsulated within the data blocks in sequence), provides the packets in-sequence over one or another logical channel to the RLC module 12a of the receiving terminal, according for example to the procedure illustrated in FIG. 3 (i.e., holding successfully received data blocks until all data blocks earlier in the sequence have been successfully received and their packets delivered to the RLC module 12a).

The so-called fast HARQ, i.e. the HARQ used by the MAC-hs layer, works as follows. When there is data to be transmitted to a given user terminal, i.e., there are packets in the MAC-hs transmit buffer, a packet scheduler allocates a downlink channel for the given user terminal, AMC control selects an appropriate modulation and coding scheme (MCS), and depending on the MCS, transmits one or several packets in a data block to the user terminal. The data block is given a sequence number, which typically is at least five bits in length.

For this explanation, it is assumed that the data block is communicated to the PHY layer in a TTI on the high speed downlink shared channel (HS-DSCH) for transmission by the PHY layer to the user terminal, whereas the sequence number is sent on the shared control channel (SCCH). In subsequent TTIs, more data, i.e., more data blocks can be transmitted to the same user terminal or to other user terminals. The data blocks sent to a given user terminal are numbered sequentially (modulo 32, if five-bit sequence numbers are used). When the user terminal receives a data block, its physical layer first decodes the shared control channel to get the sequence number (as well as other relevant information sent on SCCH). Based on the sequence number, the user terminal's physical layer checks a soft combining buffer, where it stores data blocks it has already received but which have errors, to determine whether it has already received the data block indicated by the sequence number, i.e. to determine whether the data block is a retransmitted data block. (As mentioned above, erroneous data blocks are buffered in soft decision format in the soft combining buffer to await retransmissions, and each data block stored there is associated with a corresponding sequence number). If the user terminal's physical layer determines that the data block is a retransmitted data block, then it combines the retransmitted data block and the earlier received data block, and decodes the combined data block. (The retransmission can be identical to the original transmission, in which case the ARQ scheme is called Chase combining, or the retransmission can contain additional redundancy, in which case the ARQ scheme is called incremental redundancy or type II hybrid ARQ. These and other combining methods are possible and known to a person skilled in the art.)

If there is no already received version of the data block, then the received data block is simply decoded. If the decoding is successful, i.e. if there are no errors in the data block, the receiver sends a positive acknowledgement (ACK) to the transmitter. The ACK is sent as a bit (or bits) in a predetermined position within the uplink frame using, for instance, the uplink DPCCH. If decoding fails, i.e. if there are errors in the data block, the soft decisions of the erroneous data block are stored in the soft combining buffer along with the sequence number and a negative acknowledgement (NAK) is sent to the transmitter.

If the data block was received error free, i.e. successfully, the receiver checks whether all earlier data blocks in the sequence (based on the sequence number) have already been received correctly (i.e. whether all earlier data blocks in the sequence are in the resequencing buffer and indicated as having been successfully received). If so, then the packets of the data block are delivered to higher layers (in the order in which they are encapsulated in the data block), but if not, then the data block is stored in the resequencing buffer to wait until the earlier data blocks are received correctly too. In this way, the in-sequence delivery of the packets (RLC-PDUs) can be guaranteed.

A five-bit sequence number allows a number space of 32, i.e., there are 32 different numbers in use and the data block are numbered modulo 32. However, for a five-bit sequence number, the transmit and receive ARQ windows are sized for 16 data blocks. This avoids the situation where there are at the same time in the receiver window, a data block with number n and a data block with number n+32, which are not distinguishable since (n+32) modulo 32=n. When the transmitter receives a positive acknowledgement (ACK) of the first data block in the transmit window, it moves the window up until it reaches the first unacknowledged data block. If the acknowledged data block is not the first in the window, the transmitter simply marks it as correctly received (but does not move the window) and waits for additional acknowledgements. In the receiver, when a data block is received correctly, the receive window is moved if the correctly received data block is the first in the window. When the first and possibly some next data blocks in the receive window have been correctly received, MAC-hs delivers to the higher protocol layers (such as the RLC layer) the correctly received data blocks in-sequence (and so the packets within the data blocks, in the order they were encapsulated within the data blocks), and moves the receive window to the first missing data block (i.e. the first data block not indicated as having been correctly received).

To keep the soft combining buffer to a manageable size, the invention preferably uses N-channel transmission, i.e. the use of N parallel channels by the sending entity (for example a base station) for communicating packets to the receiving entity (for example a user wireless terminal such as a mobile phone). With N-channel transmission, up to N data blocks must be stored in the soft decision buffer. The retransmissions can be either synchronous (retransmission only allowed in every $N^{th}$ TTI, i.e. in TTI number x+N, x+2N, and so on, where x is the TTI number of the first transmission) or asynchronous (retransmission allowed in any TTI after the minimum round trip delay, i.e. in TTI number x+N, x+N+1, x+N+2, and so on, where x is the TTI number of the first transmission); the numbering scheme according to the invention allows either. Preferably, the soft combining is based on the sequence numbers for either synchronous or asynchronous transmission; i.e. even in the synchronous case, the receiver should check that the sequence number of a received data block is the expected sequence number before combining the data block with an earlier received data block.

Since the sequence numbering is across the N channels, (meaning the numbering is done before distributing the blocks to different HARQ channels/processes), the invention does not require using N-channel transmission, i.e., the soft combining can be based on the sequence numbers provided that they are sent out-band. However, according to the invention, to limit the size of the soft combining buffer at the receiver, N-channel transmission is used, and a maximum of N data blocks is kept in the transmit buffer awaiting ACK, and the transmitter does not send a new data block if there are already N unacknowledged data blocks (data blocks for which either an ACK/NAK has not yet been received or for which a NAK has been received). If the transmitter already has N data blocks in its transmit buffer, the transmitter should retransmit the data blocks for which it has received NAKs instead of transmitting any additional data blocks. Each time the transmitter receives an ACK, it sends a new data block (provided that the transmit window for resequencing allows sending a new data block). (Only those blocks whose sequence numbers are within the transmit window are allowed to be sent, the restriction to such blocks preventing overflow of the receiver buffer.) Such a procedure, preventing the transmitter from sending new data blocks when there are N unacknowledged data blocks, is a kind of N-channel SAW retransmission procedure. Using a sequence number according to the invention, however, allows some more flexibility than a conventional SAW retransmission scheme. For example, with sequence numbers according to the invention, a data block can be sent on several channels without awaiting ACKs (a kind of multi-copy transmission), which can be useful when (re)transmitting the last data blocks of a message, since the delay on average can be reduced when multiple copies are sent (because of there then being a higher probability of correct decoding). The data blocks can even be soft combined, if required, based on the sequence numbers of the data blocks.

Also according to the invention, instead of using a single bit to acknowledge a data block, a bit map can be used to acknowledge several earlier data blocks. It is, however, preferable that the ACK for a data block be sent immediately following receipt of the data block even if the ACK is a bit map. With such a procedure, the ACK for some data blocks might be sent several times, but such multiple ACK signaling can help in recovering from erroneous or missing ACKs. A bit map used as an ACK signal could acknowledge either the last n data blocks for the given user, or, preferably, the last n TTIs, in which case not all the data blocks are necessarily for the given user. In case of an ACK for the last n TTIs, the ACK would be based on position, so no sequence numbers would have to be included with the ACK, whereas sequence numbers would have to be included in an ACK of the last n data blocks for a given user, because of the missing block problem.

Figure 2:
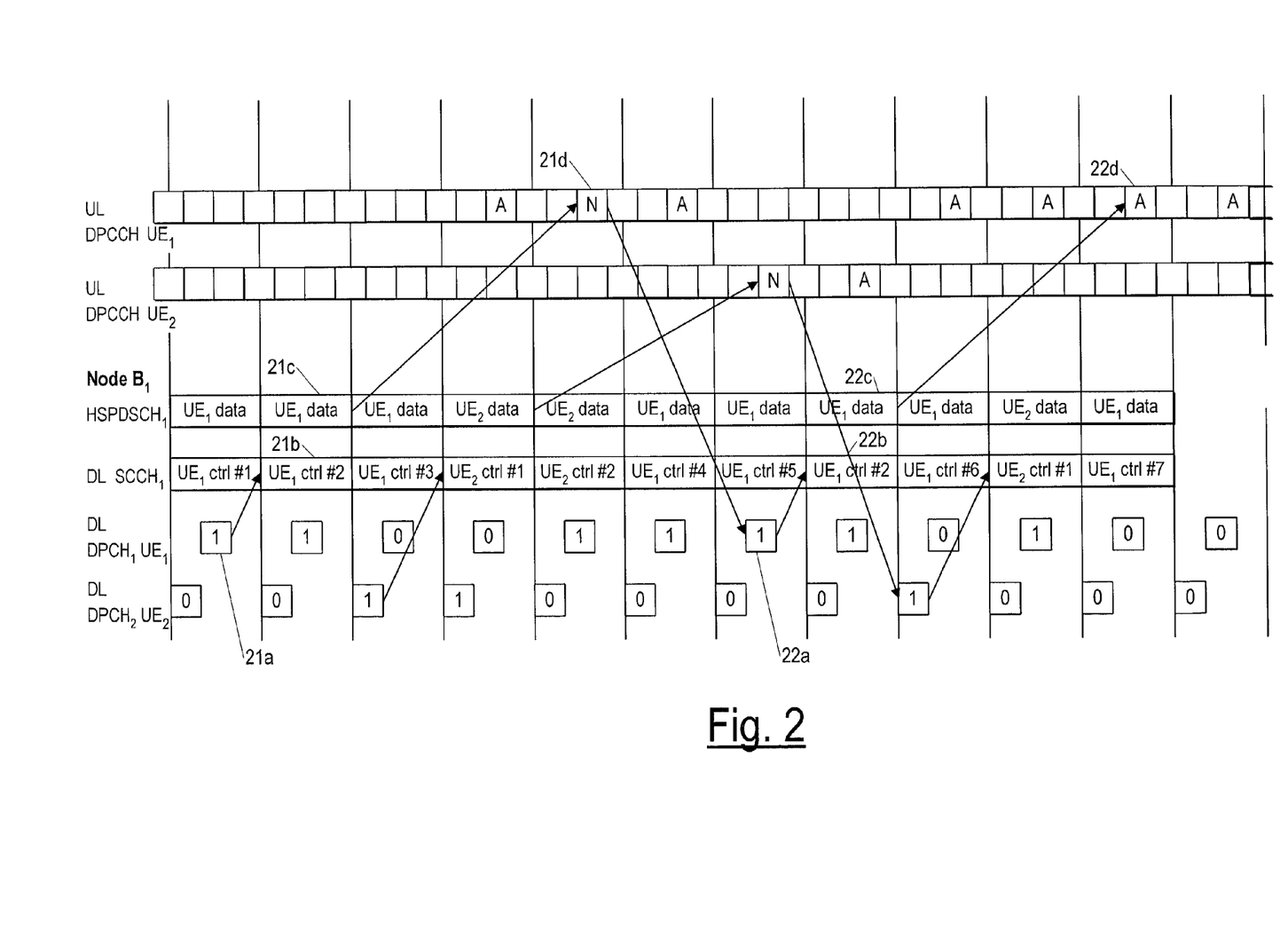
FIG. 2 is an illustration of a scenario where the sending terminal of FIG. 1 sends a data block to the receiving terminal and the data block is not at first successfully received.

Referring now to FIG. 2, an example of the transmission of a series of data blocks by a node B to a first user terminal, indicated as user terminal number 1. First, the node B sends a pointer 21*a* on the downlink (DL) DPCH to user terminal number 1, the pointer indicating to terminal number 1 that it should read DL SCCH number 1 in the next time slot. Then user terminal number 1 reads the shared control channel SCCH, where it finds, among other information, the sequence number 21*b* of the MAC-hs data block 21*c* sent on HSPDSCH (high speed physical downlink shared channel). In the example of FIG. 2, the data block 21*c* the data block is not received correctly, and so, after decoding the data block, user terminal number 1 sends an NAK 21*d* on the uplink DPCCH after a given delay. The transmitter knows which data block is being acknowledged based on the timing of the ACK/NAK. Therefore, no data block number is needed in the NAK. In response to the NAK, the node B retransmits the erroneously received data block as a new data block 22c, again providing a pointer 22a to a sequence number 22b (the same as for the originally transmitted data block), and in the example illustrated, the second transmission is successful and terminal number 1 sends an ACK 22d to the node B.

Figure 3:
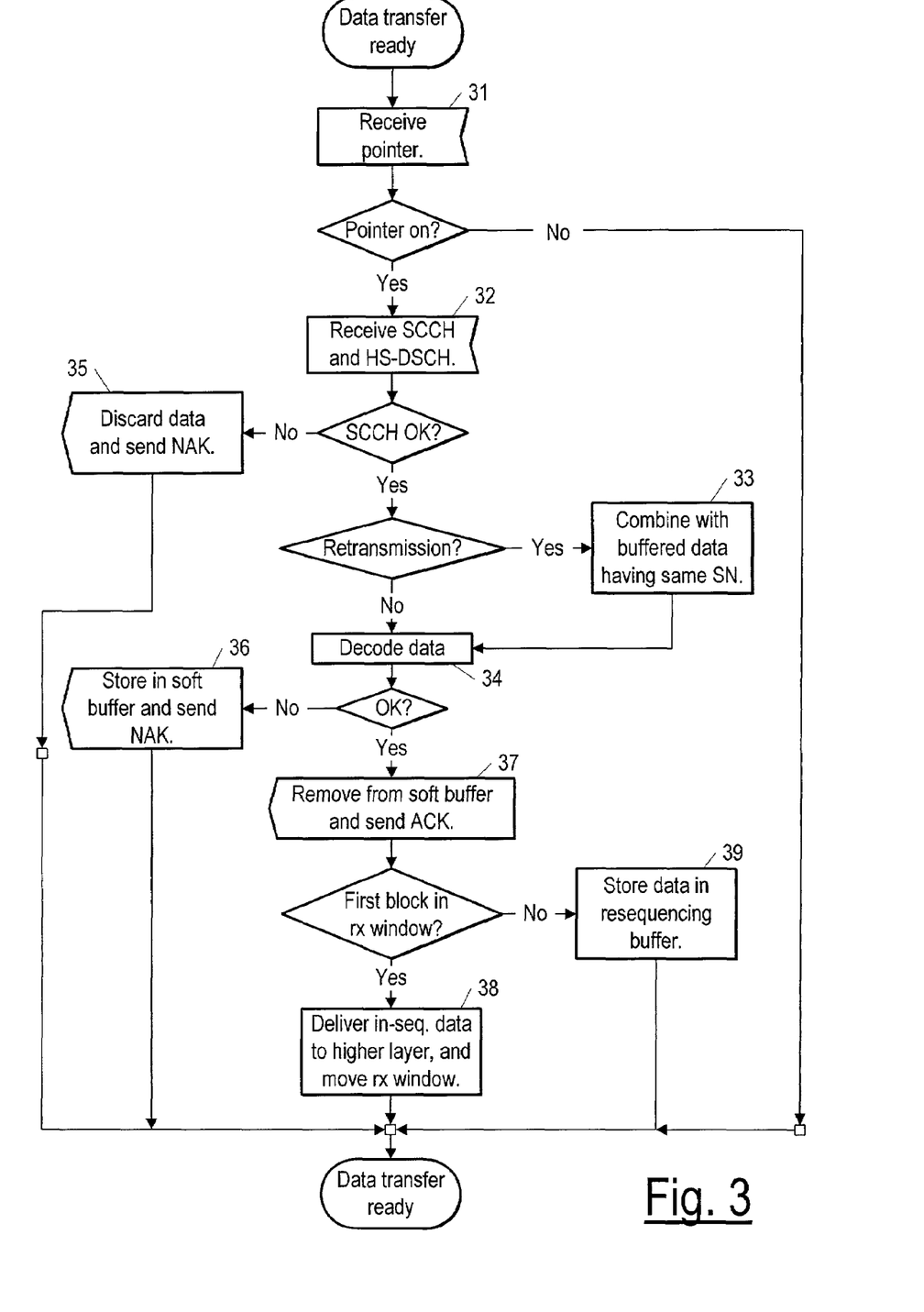
FIG. 3 is a flowchart of the operation of the receiving terminal of FIG. 1, according to the invention, in receiving a sequence of data blocks from the sending terminal of FIG. 1.

Referring now to FIG. 3, a flowchart of receiver operation according to the invention is illustrated assuming that soft buffering (i.e. the buffering in the soft combining buffer in soft decision format), soft combining and resequencing buffering is based on data block sequence numbers sent on a DL SCCH, and that ACK/NAK signaling is sent in a predetermined time position and so does not include data block sequence numbers. The receiving terminal, uses two buffers: a soft combining buffer in the physical layer in which received data blocks are held until they are decoded without error, a data block here possibly being combined with earlier transmissions of the same data block in order to do the decoding; and a resequencing buffer in the MAC-hs layer where successfully decoded data blocks in a sequence of data blocks are stored until they can be delivered in sequence. In addition, the receiving terminal uses a window, which it slides over the data blocks in the resequencing buffer, with the window positioned on the earliest data block in the sequence yet to be sent to the next higher layer of the protocol (the RLC in the example being given). The MAC-hs knows whether the first data block in the window is the next data block to be sent, or whether the next data block to be sent has not yet been successfully received and decoded, based on keeping track of the sequence number of the last data block sent to the next higher layer. (When the first data block of a new sequence is received, the MAC-hs knows it is the first data block because when the link is set up, the first block has number zero or any other predefined number.)

FIG. 3 is one example of a possible operation of the invention. Currently, it is specified (by 3GPP) that there be no pointer and SCCH is sent partly before HS-PDSCH, which is also relevant to what is indicated in FIG. 2.

The operation is shown in FIG. 3 as beginning with a first step 31 in which the receiving wireless terminal (for example a mobile phone) receives the DL DPCH allocated to it by the sending terminal (a node B in the context being described) and so receives a pointer if a pointer has been communicated. If so, then in a next step 32, the receiving terminal receives the DL SCCH pointed to and the HS-PDSCH also pointed to by the pointer communicated via the DL DPCH allocated to the receiving terminal. If the SCCH is correctly received, so that the sequence number for the data block being communicated in the HS-PDSCH is correctly read by the receiver, then if the data block is being retransmitted (which the receiver determines by comparing the sequence number with the sequence numbers of the data blocks in the soft combining buffer), then in a next step 33 the received data block is combined with data blocks in the soft combining buffer having the same sequence number and decoded in a next step 34, but if the received data block is not a retransmission, it is simply decoded in the next step 34. If, however, the SCCH is not correctly received, then in a next step 35, the receiver (e.g., the MAC-hs layer) sends an NAK to the sending terminal (i.e. according to the layered protocol and so via the PHY layer). The ACK/NAK signaling indicated in FIG. 3 is to be understood to be signaling without reference to sequence numbers. After decoding the data block, if the decoding is error-free, then in a next step 37 the data block is removed from the soft combining buffer and placed in the resequencing buffer, and an ACK is sent to the sending terminal, and then, if the data block is the first data block in the receive window that slides over the resequencing buffer (based on the sequence number), in a next step 38 it is delivered to the next higher layer of the protocol (as packets), i.e. the RLC layer, along with any other data blocks in the resequencing buffer that are in sequence, and the receive window is moved up along the resequencing buffer so that a next data block in the sequence is the first in the window, but if the decoded data block is not the first, then it is stored in the resequencing buffer for later delivery to the next higher layer. If after the step 34 of decoding the data block, it is found that the received data block is not free of errors, then in a next step 36 the data block is stored in the soft combining buffer and the receiver (e.g., the MAC-hs layer) sends an NAK to the sending terminal. Thus, the receiver performs ACK/NAK signaling without using sequence numbers, until all data blocks and their respective sequence numbers are successfully received.

Figure 4:
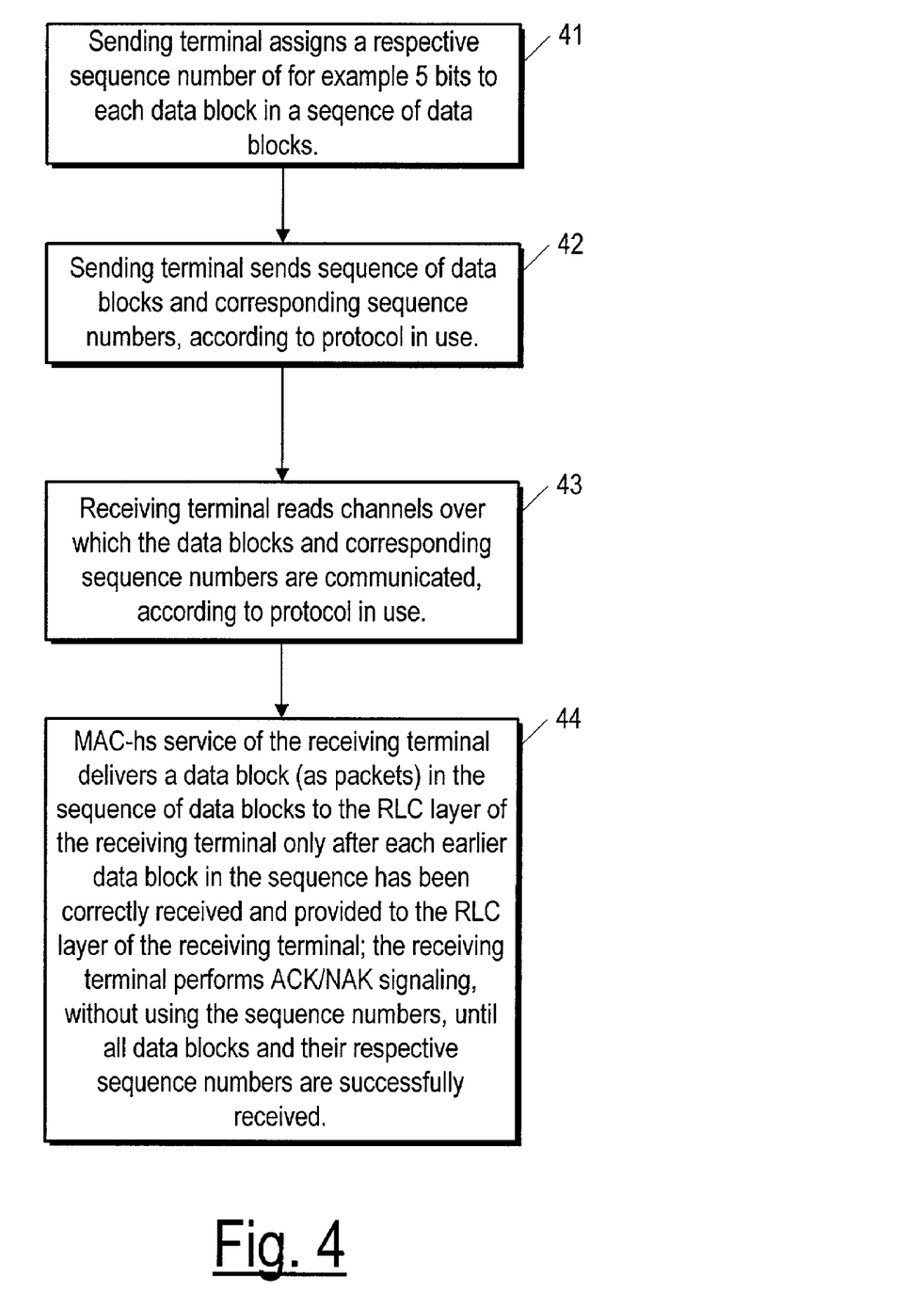
FIG. 4 is a flowchart of the overall process in which the sending terminal of FIG. 1 sends the receiving terminal of FIG. 1 a sequence of data blocks, according to the invention.

Referring now to FIG. 4, the overall procedure according to the invention for providing ACK/NAK signaling between a receiving terminal and a terminal sending data blocks to the receiving terminal is shown as beginning with a step 41 in which the sending terminal, and more specifically the MAC-hs layer of the sending terminal, assigns to each data block in a sequence of (MAC-hs) data blocks containing one or more packets (RLC-PDUs) a respective sequence number of, for example, five bits. In a next step 42, the sending terminal sends the data blocks and sequence numbers to the receiving terminal, using various possible transport channels that map to various possible physical channels; for example, in a system operating according to WCDMA, the sending terminal might use a HS-PDSCH (physical) channel to send the data blocks, and a DL SCCH channel to send the sequence numbers, as in FIG. 2. In a next step 43, the receiving terminal receives the channels over which the data blocks and corresponding sequence numbers are communicated. In a last step 44, the MAC-hs service of the receiving terminal delivers a data block (as packets) in the sequence of data blocks to the RLC layer of the receiving terminal only after each earlier data block in the sequence has been correctly received and provided to the RLC layer (as packets); during this last step 44, as illustrated in FIG. 3, the receiving terminal will perform ACK/NAK signaling, without using sequence numbers, until all data blocks and their respective sequence numbers are successfully received.

Instead of using a DL SCCH, the data block sequence numbers can be sent time multiplexed on the shared data channel, or they can be sent on the dedicated data channel (pointer channel) for the terminal for which the sequence numbers are intended. In FIG. 2, in a first embodiment, the shared control channel is transmitted at the same time as the shared data channel, and the pointer on the dedicated channel is sent before the shared channels. In a second embodiment, the shared control channel (SCCH) is sent, at least partly, before the shared data channel, and the dedicated pointer channel is sent in parallel with the shared control channel. In a third embodiment, the dedicated pointer channel and the shared control channel are sent parallel with the shared data channel. In the second embodiment, using the DL SCCH or the dedicated pointer channel, the data block sequence numbers would then be sent before the corresponding data blocks are sent on a shared data channel, and in the third embodiment, using either the DL SCCH or the dedicated pointer channel, the sequence numbers would be sent in parallel with the data blocks (which would again be sent on a shared data channel). The system could also work without the dedicated pointer channel. The data block sequence number could even be sent in-band with the data blocks, i.e., with the same CRC (error detection) as the data blocks. However, if the data block sequence numbers are sent in-band with the data blocks, the data block sequence numbers cannot be used for soft combining, and another mechanism is needed for soft combining: e.g., some form of synchronous transmission scheme (such as fully or partially synchronous N-channel SAW) or an asynchronous N-channel SAW with HARQ process numbers sent out-band. All that is required by the invention is that the data blocks be numbered and that the data block sequence number be transmitted somehow with the data blocks in the downlink, which then enables reordering of the data blocks at the receiving terminal and in-sequence delivery of the data blocks by the MAC-hs layer of the receiving terminal to the RLC layer of the receiving terminal. In addition, the ACK/NAKs are preferably based on time position (using a predetermined delay between the received data block and the transmitted ACK/NAK) and so need not include the data block sequence number (or data block numbers, in case of ACK/NAK signaling for more than one data block at a time).

Still another embodiment of the invention could use partial data block numbers in the ACK/NAK signaling, in addition to using time position. If the data block sequence number in the downlink is, e.g., five bits, the ACK/NAK signaling to the node B by the receiving terminal could include 1 or 2 bits of the data block sequence number (preferably least significant bits).

Using the invention, blocks are delivered to the RLC (the higher protocol layer) of the receiving terminal in order by the MAC-hs (an entity of the lower protocol layer) of the receiving terminal, using the MAC-hs generated sequence numbers. Furthermore, the receiving terminal sends ACK/NAK signaling to the sending terminal, ACK/NAK signaling that does not include information indicating sequence numbers of any blocks received in error. For instance, each block can be acknowledged after a predefined delay and thus the sending terminal knows which block is being acknowledged. Many prior art protocols acknowledge (in the course of ACK/NAK signaling) using a bit map where each bit indicates a data block. Typically there is at least one sequence number that indicates the starting point or the ending point of the bit map, but most of the blocks are acknowledged without an express sequence number (i.e. using a bit in the bit map, as opposed to a sequence number). In such protocols, however, even if the sequence number is not expressly indicated for each block, it is there, i.e. the signaling according to these protocols provides information indicating the sequence numbers of the blocks being referred to in the ACK/NAK signaling.

The invention does not ensure that all of the blocks are delivered to the RLC (higher protocol layer) of the receiving terminal, only that those that are delivered are delivered in order; missing blocks are requested by the higher layer from the peer higher layer in the transmitter (sending terminal). Thus, with the invention, there may be holes (missing blocks), but no block should pass ahead of any other block on its way to the higher protocol layer.

In the above description, reordering of the data blocks in the receiver has been used as an example for the use of data block sequence numbers according to the invention. Other uses are also encompassed by the invention.

SCOPE OF THE INVENTION

It is to be understood that the above-described arrangements are only illustrative of the application of the principles of the present invention. Numerous further modifications and alternative arrangements besides those indicated above may be devised by those skilled in the art without departing from the scope of the present invention, and the appended claims are intended to cover such modifications and arrangements.

What is claimed is:

1. A method, for use in a wireless communication system using a layered protocol having a plurality of protocol layers with each layer above the lowest layer using the services of the next lower layer and having a physical layer as the lowest layer and a media access control layer using the services of the physical layer, the method comprising:
    the media access control layer of a sending terminal assigning a respective data block sequence number to each data block in a sequence of data blocks, and the media access control layer transmitting to a peer media access control layer of a receiving terminal the data blocks and the respective sequence numbers via the physical layer;
    the peer media access control layer of the receiving terminal communicating to the media access control layer of the sending terminal an acknowledgement of each received data block in the sequence of blocks after a fixed delay from receiving the data block without providing information indicating the respective data block sequence numbers.

2. The method of claim 1, wherein the sequence numbers are communicated in-band with the data blocks.

3. The method of claim 1, wherein the sequence numbers are communicated out-band.

4. The method of claim 3, wherein the sequence numbers are used in hybrid automatic request combining.

5. The method of claim 1, wherein each data block is acknowledged separately.

6. A wireless terminal, for use in wireless communication, via a wireless communication system, with other communication devices including other wireless terminals, wherein the terminal is operative as either a sending terminal or as a receiving terminal according to the respective portions of the method of claim 1.

7. A base station, for use as an element of a wireless communication system providing at least parts of connections between wireless terminals and other communication devices including other wireless terminals via wireless communication, wherein the base station is operative as either a sending terminal or as a receiving terminal according to the respective portions of the method of claim 1.

8. A wireless communication system providing at least parts of connections between wireless terminals and other communication devices including other wireless terminals via wireless communication, the wireless communication system having terminals at least two of which are able to function as a sending terminal and as a receiving terminal, wherein the at least two terminals are both operative as both a sending terminal and a receiving terminal according to the respective portions of the method of claim 1.

9. A method as in claim 1, wherein the data blocks are distributed over a plurality of channels for transmission to the receiving terminal but only after assignment of the sequence numbers, and further wherein the sequence numbers are sent outband using a shared control channel.

10. An apparatus, comprising a media access control layer and a higher protocol layer of a layered protocol having a plurality of protocol layers with each layer above the lowest layer using the services of the next lower layer, and also comprising a physical layer as the loWest layer and providing services to the media access control layer, the media access control layer including:

means for receiving a sequence of data blocks and respective data block sequence numbers from the physical layer and for delivering in order at least some of the data blocks to the higher protocol layer; and means for acknowledging receipt of each of the received data blocks after a fixed delay from receiving each data block in the sequence of data blocks without providing information indicating the respective data block sequence number.

11. A wireless terminal, including an apparatus as in claim 10.

12. A base station, including an apparatus as in claim 10.

13. A wireless communication system, comprising a base station and wireless terminals each including an apparatus as in claim 10.

14. An apparatus for use by a communication terminal in providing wireless communication with another communication terminal, said apparatus comprising a media access control layer and a higher protocol layer of a layered protocol having a plurality of protocol layers with each layer above the lowest layer using the services of the next lower layer, and also comprising a physical layer as the lowest layer and providing services to the media access control layer, and wherein the media access control layer is configured to:

receive a sequence of data blocks and respective data block sequence numbers from the physical layer and deliver in order at least some of the data blocks to the higher protocol layer; and acknowledge receipt of each of the received data blocks after a fixed delay from receiving the data block in the sequence of data blocks without providing information indicating the respective data block sequence number.

15. An apparatus as in claim 14, wherein the apparatus is configured to communicate the sequence numbers in-band with the data blocks.

16. An apparatus as in claim 14, wherein the apparatus is configured to communicate the sequence numbers out-band.

17. An apparatus as in claim 16, wherein the apparatus is configured to use the sequence numbers in hybrid automatic request combining.

18. An apparatus as in claim 14, wherein the apparatus is configured to separately acknowledged each data block.

19. An apparatus as in claim 14, wherein the media access control layer has a high speed media access control entity and the higher layer is a radio link control layer.

20. A method for use by a media access control layer of a communications terminal, comprising:

assigning a respective data block sequence number to each data block in a sequence of data blocks and transmitting to a receiving terminal the data blocks and the respective sequence numbers; and receiving from the receiving terminal a positive or negative acknowledgment of receipt of each data block in the sequence of data blocks not including the respective data block sequence numbers, and identifying the corresponding data block based on a fixed delay between sending a data block and receiving a positive or negative acknowledgment for the data block.

21. A method for use by a media access control layer of a communications terminal, comprising:

receiving from a transmitting terminal a sequence of data blocks and respective data block sequence numbers; and providing after a fixed delay a positive or negative acknowledgment of receipt of each of the data blocks in the sequence of data blocks without including the respective data block sequence number.

22. An apparatus for use by a communication terminal operative according to a layered protocol having a physical layer as the lowest layer, comprising:

a media access control layer, configured to assign a respective data block sequence number to each data block in a sequence of data blocks and transmit to a receiving terminal the data blocksand the respective sequence numbers using the physical layer; and further configured to receive from the receiving terminal via the physical layer a positive or negative acknowledgment of receipt of the data blocks not including the respective data block sequence numbers;

wherein the media access control layer is still further configured to identify the corresponding data block in the sequence of data blocks based on a fixed delay between sending a data block and receiving a positive or negative acknowledgment for the data block.

23. An apparatus as in claim 22, wherein the apparatus includes a radio link control layer for which the media access control layer provides services.

24. An apparatus for use by a communication terminal operative according to a layered protocol having a physical layer as the lowest layer, comprising a media access control layer including:

means for assigning a respective data block sequence number to each data block in a sequence of data blocks and transmitting to a receiving terminal the data blocks and the respective sequence numbers using the physical layer; and means for receiving from the receiving terminal via the physical layer a positive or negative acknowledgment of receipt of each of the data blocks in the sequence of data blocks not including the respective data block sequence numbers, and for identifying the corresponding data block based on a fixed delay between sending a data block and receiving a positive or negative acknowledgment for the data block.

* * * * *

UNITED STATES PATENT AND TRADEMARK OFFICE
CERTIFICATE OF CORRECTION

PATENT NO. : 7,310,336 B2
APPLICATION NO. : 10/102528
DATED : December 18, 2007
INVENTOR(S) : Esa Malkamaki Page 1 of 1

It is certified that error appears in the above-identified patent and that said Letters Patent is hereby corrected as shown below:

In column 12, line 21, claim 1, line 17, before "blocks", --data-- should be inserted.

In column 12, line 65, claim 10, line 5, , "loWest" should be --lowest--.

In column 14, line 21, claim 22, line 7, "blocksand" should be --blocks and--.

Signed and Sealed this

Seventeenth Day of June, 2008

JON W. DUDAS
*Director of the United States Patent and Trademark Office*